(12) United States Patent
Friscia

(10) Patent No.: US 11,064,677 B2
(45) Date of Patent: Jul. 20, 2021

(54) LIGHTED PET BED

(71) Applicant: Matthew Friscia, Franklin Lakes, NJ (US)

(72) Inventor: Matthew Friscia, Franklin Lakes, NJ (US)

(*) Notice: Subject to any disclaimer, the term of this patent is extended or adjusted under 35 U.S.C. 154(b) by 33 days.

(21) Appl. No.: 14/747,216

(22) Filed: Jun. 23, 2015

(65) Prior Publication Data

US 2016/0374310 A1   Dec. 29, 2016

(51) Int. Cl.
*A01K 1/03* (2006.01)
*A01K 1/035* (2006.01)
*F21V 23/04* (2006.01)
*F21V 33/00* (2006.01)
*F21W 131/301* (2006.01)

(52) U.S. Cl.
CPC .......... *A01K 1/0353* (2013.01); *F21V 23/045* (2013.01); *F21V 33/0012* (2013.01); *F21W 2131/301* (2013.01)

(58) Field of Classification Search
CPC .... A01K 1/0353; A01K 1/035; A01K 15/021; G08B 25/10
USPC .......................................................... 119/28.5
See application file for complete search history.

(56) References Cited

U.S. PATENT DOCUMENTS

| | | | |
|---|---|---|---|
| 2,185,051 A * | 12/1939 | Daigle | F21S 8/00 200/85 R |
| 2,252,191 A * | 8/1941 | Marks | A01K 41/00 119/309 |
| 2,418,877 A * | 4/1947 | Gustafson | F21V 33/00 362/130 |
| 3,533,095 A * | 10/1970 | Collins | A61D 17/008 119/28.5 |
| 4,149,222 A * | 4/1979 | Linde | F21V 25/04 362/130 |
| 4,220,984 A * | 9/1980 | Truher | A47C 21/003 362/130 |
| 4,544,993 A * | 10/1985 | Kirk | F21S 8/032 362/153 |
| 4,780,706 A * | 10/1988 | Bollag | A01K 1/035 340/573.3 |
| 4,924,214 A * | 5/1990 | Hill | G08B 13/10 200/86.5 |
| 4,947,298 A * | 8/1990 | Stephen | A47C 21/003 200/85 R |
| 4,951,032 A * | 8/1990 | Langsam | G08B 21/22 340/522 |
| 5,210,528 A * | 5/1993 | Schulman | G08B 3/10 200/86 R |
| 5,519,380 A * | 5/1996 | Edwards | G08B 21/22 340/539.1 |
| 5,683,169 A * | 11/1997 | Lucas | A47C 21/003 362/130 |
| 5,780,798 A * | 7/1998 | Hall-Jackson | A61B 5/11 200/85 R |

(Continued)

FOREIGN PATENT DOCUMENTS

| | | | | |
|---|---|---|---|---|
| GB | 2530332 | * | 9/2014 | ............ A01K 15/02 |
| GB | 2530332 A | * | 9/2014 | ............ A01K 15/02 |

*Primary Examiner* — Ebony E Evans
(74) *Attorney, Agent, or Firm* — McCarter & English, LLP

(57) ABSTRACT

A pet bed with lights to allow a pet to easily see the bed. A circuit for turning the lighting on and off can include a pressure switch, a remote control or a timer.

3 Claims, 2 Drawing Sheets

(56) References Cited

U.S. PATENT DOCUMENTS

| | | | | |
|---|---|---|---|---|
| 6,234,642 B1* | 5/2001 | Bokamper | A47C 21/003 362/130 |
| 6,433,699 B1* | 8/2002 | Slomowitz | G08B 21/0208 340/539.1 |
| 7,297,089 B2* | 11/2007 | Chen | A63B 5/11 482/1 |
| 8,220,089 B1* | 7/2012 | Diefenbach | A47D 9/02 5/655 |
| 8,451,129 B2* | 5/2013 | Hamdan | A61B 5/1113 340/573.1 |
| 8,717,181 B2* | 5/2014 | Tallent | G08B 21/22 340/573.4 |
| 9,661,931 B2* | 5/2017 | Luciano | A47C 21/003 |
| 2001/0001237 A1* | 5/2001 | Stroda | A61B 5/1113 340/573.4 |
| 2002/0067273 A1* | 6/2002 | Jaques | G08B 21/22 340/573.4 |
| 2002/0117115 A1* | 8/2002 | Helwig | A01K 1/0353 119/28.5 |
| 2003/0037372 A1* | 2/2003 | Andriunas | A47D 7/04 5/95 |
| 2006/0288949 A1* | 12/2006 | Axinte | A01K 1/0158 119/169 |
| 2008/0022935 A1* | 1/2008 | Fine | A01K 1/0353 119/28.5 |
| 2008/0173627 A1* | 7/2008 | Martin | A01K 1/0353 219/201 |
| 2008/0235869 A1* | 10/2008 | Steffes | A47D 7/002 5/282.1 |
| 2011/0232577 A1* | 9/2011 | Ryan | A01K 1/0218 119/28.5 |
| 2012/0074867 A1* | 3/2012 | Shih | H05B 45/37 315/294 |
| 2014/0251234 A1* | 9/2014 | Deutsch | A01K 15/021 119/721 |
| 2018/0368355 A1* | 12/2018 | Repins | A01K 1/0158 |

* cited by examiner

LIGHTED PET BED

BACKGROUND

Field

The present disclosure generally relates to pet beds, and more particularly, to lighted pet beds.

Related Art

Pet beds are well known and come in all shapes and sizes. Some pet beds are plush and others are less so. A pet bed is generally there a pet will spend the night asleep.

SUMMARY

A pet bed is provided with lighting to allow a pet to easily see the bed. The bed can include a circuit with a pressure sensor to turn off the light when the pet is on the bed. A timer could be included to allow a delay in shut off after the pet is on the bed. A remote control can be used to turn the pet bed lighting on and off.

BRIEF DESCRIPTION OF THE DRAWINGS

The foregoing features will be apparent from the following Detailed Description, taken in connection with the accompanying drawings, in which.

DETAILED DESCRIPTION

Figure 1:
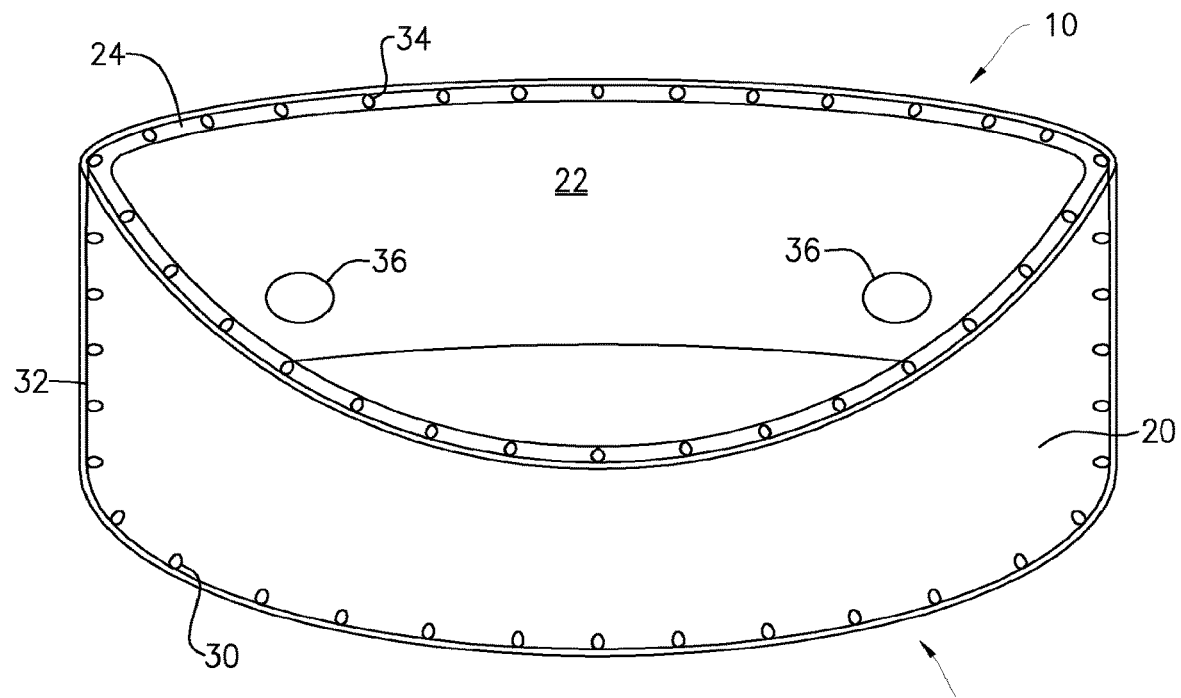
FIG. 1 is a perspective view showing a lighted pet bed.

A pet bed with lights is shown in FIG. 1. The pet bed, generally indicated at 10, could be of any configuration, size or shape. The pet bed 10 is where a pet can sleep or spend time. It could be plush or not. It could be wholly or partially enclosed. It could be a mattress or a cushion or a cage or some other structure used by a pet. As shown in FIG. 1, the pet bed includes a base 12 and an upper surface 14. The pet bed 10 could also include an upstanding side wall 20 having an interior side 22 and a top edge 24.

The pet bed includes one or more lights or light emitting devices or light sources. As shown in FIG. 1, base lighting 30 can be provided along base 12. Sidewall lighting 32 can be provided along sidewall 20. Upper lighting 34 can be provided along the upper edge 24 of the sidewall. Interior lighting 36 can be provided on interior sidewall 22. Lighting can be provided at any area, on any surface, of the pet bed 10. Lighting for the bed can also be positioned remotely from the pet bed 10.

Lighting for the pet bed 10 can take on any suitable form. For example, a string of lights can be used for any of the base lighting 30, sidewall lighting 32, upper lighting 34 or interior lighting 36. A string of lights could be used at any appropriate location associated with the pet bed 10. Light emitting diodes can be used at any location on the pet bed 10. Any type of single light source can be used at any appropriate location associated with the pet bed 10, such as for interior lighting 36. Fiber optics could be used at any location on the pet bed 10. Any type of light or light emitting device or light source can be used with the pet bed 10, including, but not limited to, incandescent lights, light-emitting diodes, electroluminescent lighting, etc. The lighting associated with the pet bed 10 allows a pet to easily see and locate the pet bed 10.

Figure 2:
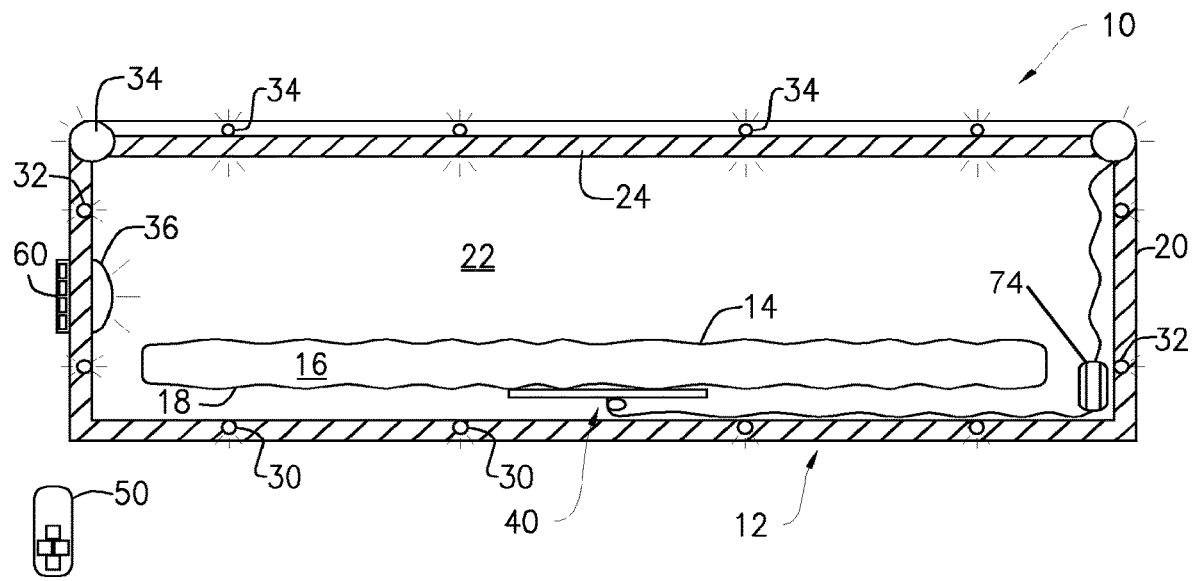
FIG. 2 is a cross sectional view of the pet bed shown in FIG. 1.

With reference to FIG. 2, the pet bed 10 depicted in FIG. 1, is shown in cross section. The pet bed 10 includes base 12. A mattress 16 includes upper surface 14 and lower surface 18. Sidewall 20 includes interior side 22 and top edge 24. The pet bed can include base lighting 30, sidewall lighting 32, upper lighting 34 and interior lighting 36. A power source 74 is positioned within the pet bed 10 as shown in FIG. 2.

Lighting controls can be provided for the lights on the pet bed 10. Such controls can take on numerous forms. For example, as shown in FIG. 2, a pressure switch 40 can be provided under the lower surface 18 of mattress 16, such that the weight of a pet on the mattress closes the pressure switch 40 to turn the lighting off when the pet is positioned on the mattress. A delay can be incorporated to give the pet time to become comfortable on the pet bed 10 before the lighting goes off. Alternatively, or additionally, lighting for the pet bed 10 could be controlled by remote control 50 which communicates with a signal receiving device in the pet bed. The remote control could be used to turn the lighting on and off and could be used to adjust the brightness of the lighting. Alternatively, or additionally, lighting controls 60 can be provided on the pet bed 10. The lighting for pet bed 10 can also be controlled be a timer or any other control mechanism.

Figure 3:
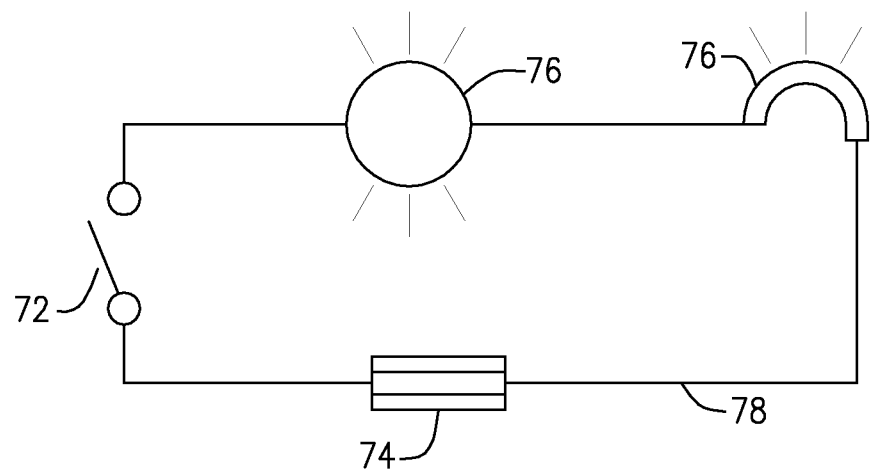
FIG. 3 is a schematic diagram of a circuit for the lighted pet bed.

As shown in FIG. 3, a circuit 70 can be used with the pet bed 10. The circuitry 70 can include a switch 72, a power source 74, one or more lights 76 and wiring 78 interconnecting the circuitry components. The switch 72 could be electronic or physical and can be operated in any suitable manner. The power source 74 could be a battery or battery pack or it could be alternating current. The lighting 76 and wiring 78 can be of any suitable form. A pet bed 10 could include one or more circuits 70.

Figure 4:
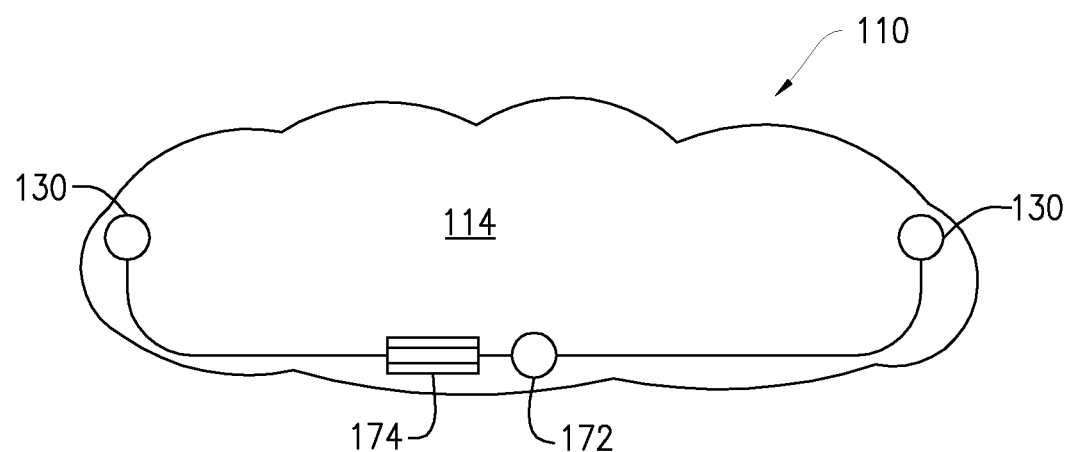
FIG. 4 shows a lighted pet bed in the form of a mat.

FIG. 4 shows a pet bed 110 in the form of a mattress 116 having an upper surface 114, lights 130, power source 174 and switch 172. The pet bed 110 can be controlled as discussed herein.

While the invention has been described in detail and with reference to specific examples thereof, it will be apparent to one skilled in the art that various changes and modifications can be made therein without departing from the spirit and scope thereof.

What is claimed is:

1. A lighted pet bed comprising:
   a mattress having a top on which a pet can sleep;
   a sidewall having an upper edge, the side wall extending completely about the mattress, the upper edge of the sidewall positioned above the mattress at all locations about the mattress;
   a first set of one or more lights positioned on an interior of the sidewall and over the mattress to illuminate the top of the mattress;
   a second set of a plurality of lights positioned along the upper edge of the sidewall;
   a circuit connected between the first set of lights on the interior of the side wall, and the second set of lights on the upper edge of the sidewall, and a power source;
   a pressure switch within the circuit and positioned under the mattress for turning the first set of lights on the interior of the sidewall, and the second set of lights on the upper edge of the sidewall, off in response to a pet on the mattress;

the first set of lights on the interior of the sidewall illuminating the top of the mattress in response to a pet not on the mattress; and the first set of lights on the interior of the sidewall, and the second set of lights on the upper edge of the sidewall turn off in response to a pet on the bed and the weight of the pet closes the pressure switch to turn off the first and second sets of lights.

2. The lighted pet bed of claim 1 wherein the first set of lights positioned on the interior of the sidewall comprises one of a single light source and incandescent lights.

3. The lighted pet bed of claim 2 wherein the second set of lights positioned along the upper edge of the sidewall comprises one of a string of lights, light emitting diodes, fiber optics and electroluminscent lighting.

* * * * *